(12) United States Patent
Smith, Jr. et al.

(10) Patent No.: US 7,997,628 B1
(45) Date of Patent: Aug. 16, 2011

(54) MECHANICALLY RESTRAINED PUSH-ON PIPE CONNECTION

(76) Inventors: Fred R. Smith, Jr., Yukon, OK (US); William L. Jones, Moore, OK (US)

( * ) Notice: Subject to any disclaimer, the term of this patent is extended or adjusted under 35 U.S.C. 154(b) by 44 days.

(21) Appl. No.: 12/399,094

(22) Filed: Mar. 6, 2009

Related U.S. Application Data (60) Provisional application No. 61/068,570, filed on Mar. 7, 2008.

(51) Int. Cl.
*F16L 21/00* (2006.01)
(52) U.S. Cl. .................. 285/403; 285/404; 29/525.11
(58) Field of Classification Search .................. 285/404, 285/403, 400, 342, 343; 29/525.11
See application file for complete search history.

(56) References Cited

U.S. PATENT DOCUMENTS

| | | | |
|---|---|---|---|
| 2,052,394 A * | 8/1936 | Fullman | 285/404 |
| 3,920,270 A | 11/1975 | Babb, Jr. | |
| 3,941,410 A * | 3/1976 | Miyaoka | 285/404 |
| 4,417,754 A | 11/1983 | Yamaji et al. | |
| 4,438,954 A * | 3/1984 | Hattori | 285/404 |
| 4,799,714 A * | 1/1989 | Collet | 285/421 |
| 4,819,974 A * | 4/1989 | Zeidler | 285/404 |
| 5,071,175 A | 12/1991 | Kennedy, Jr. | |
| 5,165,735 A * | 11/1992 | Nardi et al. | 285/404 |
| 5,332,043 A * | 7/1994 | Ferguson | 285/322 |
| 5,351,999 A * | 10/1994 | Hattori | 285/404 |
| 5,431,453 A * | 7/1995 | Yamashita et al. | 285/404 |
| 5,509,699 A | 4/1996 | Himmelberger | |
| 5,992,905 A | 11/1999 | Kennedy, Jr. et al. | |
| 6,106,031 A * | 8/2000 | Guginsky | 285/404 |
| 6,173,993 B1 | 1/2001 | Shumard et al. | |
| 6,322,273 B1 | 11/2001 | Gentile, Jr. | |
| 6,328,343 B1 * | 12/2001 | Hosie et al. | 285/404 |
| 7,266,875 B2 | 9/2007 | Longacre et al. | |
| 7,341,288 B2 | 3/2008 | Lundstrom | |

* cited by examiner

*Primary Examiner* — David E Bochna
(74) *Attorney, Agent, or Firm* — James F. Harvey, III

(57) ABSTRACT

An apparatus, system, and method for the secure attachment and restraint of a pipe end within a fitting is disclosed. The invention includes a mechanical restraint apparatus that is integral and monolithic with the flange of a bell of a spigot-and-bell joint architecture, along with one or more internally disposed grooves within the bell that receive a circumferential gasket, in order to maintain a seal about the pipe end when it is inserted into the bell. The inventive apparatus combines features of mechanical connections and push-on connections.

14 Claims, 4 Drawing Sheets

MECHANICALLY RESTRAINED PUSH-ON PIPE CONNECTION

CROSS-REFERENCES TO RELATED APPLICATIONS

This application claims the benefit of U.S. Provisional Patent Application No. 61/068,570, filed on Mar. 7, 2008, entitled "Specifications for a Restrained Push-On Connection for Push-On Pipe," the contents of which are hereby incorporated by reference in their entirety.

BACKGROUND OF THE INVENTION

The present invention generally relates to methods and devices for coupling pipes together and more particularly relates to a integral restraining mechanism for an end of a pipe that sealingly holds another pipe, conduit, valve housing, or similar member in coupled relationship with the pipe.

Over the years, various devices and methods have been used to couple pipe of all types with other pipe, valves, various pipe fittings, hydrants, and miscellaneous connections, where pipe is secured to another member and thereafter subjected to internal fluid pressure which tends to separate the pipe from the member to which it is coupled. Typical uses for a variety of such pipe devices are sewer systems, water distribution systems, and the like. The pipe and fittings used in such systems have been traditionally fabricated from ductile iron pipe, but in recent years plastic pipe such as pipe made from polyvinyl chloride (i.e. PVC pipe) has been used in certain applications. It is also been common in such systems to use fittings and valves made primarily for use with cast and ductile iron pipe.

Many pipe systems must accommodate high hydraulic pressures. When coupling two lengths of pipe together or when coupling a length of pipe to a fitting or a valve, the joint must resist these high pressures that would tend to both separate the joint and also force the liquid out of the joint. Joint architectures in general use are of the bell and spigot type where the pipe is inserted into a receiving circular recess that encloses the pipe end. To capture and hold the pipe end within the recess, a fitting is used to secure the pipe end. Two principal types of fittings, the push-on joint fitting and the mechanical joint fitting, are in general use today.

The push-on joint fitting, as exemplified by U.S. Pat. No. 3,963,298, issued to Seiler, receives the pipe end and frictionally holds it within the bell. The pipe end and the bell are first cleaned to remove any debris. A gasket, which is usually shipped separately, is then placed inside the bell in a gasket seat by looping the gasket and forcing it into place, compressing the gasket slightly in the circumferential direction which causes the gasket to remain in place. The pipe is then cut to size and plain end of the pipe is mechanically beveled or tapered, as by grinding, in order to push it past the gasket in the fitting into the bell.

A jacking mechanism may then be attached to the pipe end and the bell in order to force the tapered end of the pipe past the gasket until the pipe bottoms out in the socket. A considerable force is required to insert the pipe end past the gasket; with short lengths of pipe, control during the insertion action becomes problematic, since the short piece of pipe tends to buckle out of alignment during the force application, hence the necessity for complicated special rigging to provide this force in a controlled way. The pipe end and the bell may be lubricated with a soft soap or other applicable lubricant in order to reduce the force requirement.

In some cases, joint restraint is provided by special gaskets with steel clips, molded into the gasket. In these cases, the joint must be jacked in the reverse direction after assembly to insure that the clips have locked onto the pipe. If disassembly is necessary, thin shims must be hammered into the joint to lift the clips out of their locked positions prior to jacking the joint apart with the special rigging.

Since the assembly of these push-on fittings can be a complicated and time consuming, most fittings in use today are mechanical joint fittings. They are standardized to conform to the requirements of ANSI/AWWA C111/A21.11, "Rubber-Gasket Joints for Ductile-iron Pressure Pipe and Fittings". A mechanical joint consists of a tapered gasket seat, a tapered or wedge shaped gasket, and a follower ring or "gland". Both the bell of the fitting and the gland are provided with a flange having axial bolt holes. While regular bolts can be used, special "T-Bolts" are generally used to connect the gland to the bell. The number of bolts required may depend upon the pipe diameter, ranging from four on a 3-inch pipe and eight on a 12-inch pipe, up to thirty-two on the 48-inch pipe.

In assembling the joint in the field, the pipe end and bell are cleaned to remove debris that might interfere with the seal. The gland is then placed over the pipe end with its special compression "lip" of the gland directed toward the pipe end. The gasket may then be lubricated as before and stretched over the end of the pipe with its tapered surface toward the pipe end. Beveling or tapering of the pipe end is not required, as with the push-on fitting. The pipe end may then be inserted into the bell with minimal force until the pipe end bottoms out in the socket, thus avoiding the use of special rigging. The gasket is then brought forward and inserted into the gasket seat, where it is caulked or pounded into place as necessary. The gland is brought into position touching the gasket, and T-bolts are inserted into holes provided about the bell and through the holes in the gland where they are captured by nuts. The bolts must be tightened in a "star" pattern, in order to maintain alignment during tightening, first tightening one bolt then the opposite bolt, 180° from the first, then the bolt 90° from the last bolt, and so forth, until all bolts have at least 75 to 90 ft.-lb. placed on them for sizes 3-inch through 24-inch and more for the larger sizes. This is an arduous and time consuming task and requires experience, skill, and strength on the part of the worker. The environmental conditions present in the field when the gland is installed, i.e. rain, snow, freezing temperatures, and the like, may further complicate the process.

One problem associated with the T-bolt tightening process as described above is that adjoining bolts loosen as one bolt is tightened to bring the gland closer to the bell. As tightening proceeds, a bolt is brought into the required torque range, the next bolt is also brought the torque range, and so forth, until all of the bolts have been tightened at least once; if the first bolt is then checked, it is found to be loose and not torqued properly. The act of tightening all bolts will necessarily loosen some of the bolts. These bolts must again be tightened and re-tightened until all bolts are within the specified torque range. This process may ordinarily be repeated five or more times until the torque on all bolts is stabilized.

Another problem is that, after tightening, if the joint is left for about thirty minutes, the bolts will lose torque, because of what is commonly referred to as "cold flow" of the gasket. Although if the original torque level was above the 75 ft.-lb. level the joint will not ordinarily leak, the fact of the loss of torque makes determining the cause of a leak very confusing. It is often very difficult to determine if the bolts were or were not tightened properly.

Most fittings are also installed in a trench, making access to the bolts on the bottom of the joint a problem. The most frequent complaint is a leaky joint caused by loose bolts on the bottom of the joint usually due to the difficulty of getting to these bolts.

One benefit of a mechanical joint is that the joint requires no unusual equipment to assemble. Second, if a mistake is made, the mistake at least can be remedied since disassembly is reasonably simple. Disassembly of a push-on joint is complicated, requiring special tools, and often results in having to cut the pipe in order to separate the joint. Although skill and some strength are required to assemble a mechanical joint, mistakes can be corrected without having to replace the pipe and/or fitting.

Other variants of pipe joints and fittings exist. The prior art patents describe two mechanisms having somewhat similar actions. One is referred to as a "Bayonet locking ring". The bayonet ring is a gland ring having integral protruding segments on its outer surface which interact with like integral segments in the bell of a pipe to retain the ring in the bell. This bayonet ring imparts no forward motion and can usually be rotated by hand. This mechanism is referenced in Bram, U.S. Pat. No. 3,765,706, Oct. 16, 1973. A second mechanism is a "Breech Lock" ring also having integral protruding segments on its outer surface which interact with like segments in the bell to retain the gland ring and also impart forward motion when the ring is rotated. Such a mechanism can be seen in U.S. Pat. No. 4,402,531, Sep. 6, 1983, to Kennedy. These segments have an inclined surface and can either be an interrupted single thread screw or separate and wedge-like. In this invention, the segments are separate and wedge-like. The breech lock ring is usually used also to compress some type of gasket and must be tightened using more force than can be applied by hand.

In order to keep the joint from separating, the pipe must be firmly attached through use of an attachment means to the other pipe or to the fitting. To keep the joint water-tight, a gasket is typically inserted between the pipe end and the other pipe or fitting and held firmly in place by the attachment means. Generally the attachment means may be comprised of a separate restraining device, or restrainer ring, that grasps a pipe and maintains the pipe in firm abutment with a gasket between the pipe end and the other pipe or fitting, in order to prevent water from escaping from the joint. Typically the other pipe or fitting has a bell-shaped flange that receives and surrounds the pipe end and gasket a short distance.

The principal problem presented by such joints is gripping or grasping the pipe. Pipe joint restraining devices relying on friction alone are very unpredictable. To restrain reasonable amounts of internal pressure in pipe, it has been found necessary to create a groove in the surface of the pipe deep enough and wide enough to provide adequate shear strength to resist large axial loads created by the pressure. The soft character of PVC pipe has made it necessary to create grooves around the outer surface of the pipe over a major portion of its circumference without either damaging the pipe or reducing the capability of the pipe to withstand pressure. To create a system using PVC pipe to resist high axial loads, one or more parallel grooves should be provided about the external circumference of the PVC pipe, the groove having sufficient depth along almost the entire circumference. The radial loads on the pipe must be kept at a minimum to prevent damage to the pipe, as by crushing, after the groove has been formed. The pipe joint restraining device must include a thrust resisting engaging means that remains in these external circumferential groove or grooves.

A substantial number of prior art patents show a wide variety of apparatus and methods for attachment to grip a pipe. Several devices have used an inclined plane to create enough mechanical advantage to grip a pipe to prevent separation. See the following U.S. Patent Numbers: Gammeter, U.S. Pat. Nos. 1,898,623; Yano, 3,594,023; Sato, 3,937,500; Felker, 4,070,046; Yamaji, 4,417,754; and Hattori, 4,438,954. These devices all provide a separate external annular mechanism having no limit to the travel of the wedging member, and thus there is little or no limit to the radial deflection of the pipe ring due to the extreme radial force. Also, these devices require extremely strong rings and pipe if high pressures and large diameter pipe are restrained.

U.S. Pat. No. 3,920,270, issued to Babb, provides a front flange on his grip ring which could be used as a limit to the travel of the wedge. However, if the pressure continues to increase after the wedge reaches its limit, the result is a toggle which creates extreme radial force on the pipe as the wedge overturns.

U.S. Pat. No. 4,092,036, issued to Sato, shows a wedging action with a limit in the form of a rear wall in a housing which contacts the wedge at the rear and thus stops the travel of the wedge. Actual experience with this device used on ductile-iron as well as PVC pipe indicates that because of the oval shaped hole in the top of the housing a toggle action around the intersection of features 28 and 43 in FIG. 7a as a pivot point allows the rear tooth to disengage and the front tooth to dive into the pipe. This action increases the radial stress in large diameter pipe at very high pressures, i.e., 500 psi.

Toggling has also been used to grip the surface of the pipe in joint restraint designs. Dillon, U.S. Pat. No. 1,930,194, Hashimoto, U.S. Pat. No. 4,647,083 and Moussiaux, British Patent 1,403,671, show toggling or Belleville spring devices. Toggling involves pivoting about a point slightly off the vertical center line of the mechanism. As the pivot point passes the vertical, deflection of the pipe or the groove usually remains. In Hashimoto, for a 12 inch pipe and a 1 inch toggle arm the maximum groove depth would be approximately 0.026 inch.

The key to a reliable restraint means for PVC pipe, especially on larger diameters, is the ability to reliably create these grooves. Other devices such as those described in Roche, U.S. Pat. No. 4,336,959 and Bradley, U.S. Pat. No. 4,568,112 form grooves in the pipe with side bolts connecting two half rings. This does not produce enough force to reliably create multiple grooves completely around a large diameter pipe such as 12 inch through 30 inch pipe. The result is slippage on the pipe and premature failure. Tests on large diameter versions of these devices have shown that grooves are created only near the side bolts. When the pressure is increased, shear failures in these limited grooves cause sudden slippage and impact on the highly stressed PVC pipe. The result is sudden premature bursting of the pipe itself at pressures well below those required by the AWWA standard.

As can be seen, there is a need for a mechanical fitting for a pipe joint that allows the joint to be fabricated in less time than the time it takes to fabricate a joint using a separate gland and gasket, that does not require special tools or jacking mechanisms to engage the items forming the joint, and that can be assembled in inclement weather or adverse conditions in a shortened time period.

SUMMARY OF THE INVENTION

A pipe restraint system is provided by the invention, where the pipe restraint system comprises a pipe having a pipe end and an pipe outer surface; and a fitting having a bell sized to receive the pipe end, the bell having an inner bell surface, an outer bell surface, a centerline traversing therethrough, a pipe restraint device; and a gasket for insertion within a circumferential groove about the inner bell surface, the gasket sized to maintain snug contact with the outer pipe surface of the pipe end to prevent a liquid passing through the pipe and the fitting from escaping through the junction between the outer pipe surface and the inner bell surface. The pipe restraint device may be integral to the bell to form a monolithic structure, with the pipe restraint device comprising a housing having internal wall surfaces defining a wedge pocket along the inner bell surface, the housing having a threaded hole opening with an axis substantially perpendicular to the centerline, the threaded hole extending from the housing to the outer bell surface; a wedge shaped to be received within the housing, the wedge having a bottom surface with a protuberance extending therefrom for engagement with the outer pipe surface at the pipe end; and a tightening bolt sized for threaded insertion into the threaded hole from the outer bell surface in a direction perpendicular to the centerline, the tightening bolt having an inner end and an outer end, the inner end adapted to engage the wedge when the tightening bolt is advanced into the housing from the outer bell surface, the outer end with a gripping means for engagement with a tool to allow rotational force exerted by the tool to advance the tightening bolt towards the centerline and thereby cause the wedge and tooth to engage the outer pipe surface.

A pipe restraint device is provided by the invention, where the pipe restraint device comprises a bell having an integral pipe restraint apparatus formed therein as by casting.

A method is also provided by the invention for assembling a pipe restraint system within a trench in the field, where the pipe restraint system is integral to either a fitting or a pipe end which may comprise the joint.

These and other features, aspects, and advantages of the present invention will become better understood with reference to the following drawings, description, and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the current invention includes systems, devices, and methods providing a bell-and-spigot type of joint architecture for joining two lengths of pipe or joining a length of pipe to a fitting by use of a fastening mechanism that is integral to the pipe end or to the fitting. Fittings contemplated for use with the invention may include valves, elbows, terminating devices, and other such devices having a bell-shaped receptacle that receives a pipe end. The invention comprises an improved restrained push-on connection for push-on pipe, which is a hybrid of the push-on and mechanical connection architectures. Portions of the restraint mechanism provided by the invention may be cast into the bell of the fitting, so that the restraint mechanism and the bell of the fitting are integrated into a monolithic casting. The inventive device may be used with pipes fabricated from ductile iron, PVC, or similar materials.

The invention may also comprise one or more gaskets that are captured in circumferential grooves within the bell interior. A pipe end inserted through the gasket or gaskets may be held a distance from the inner end of the bell to allow for expansion and contraction of the pipe. Because the invention places gaskets within the bell and around the circumference of the inserted pipe end, it eliminates the problem of "cold flow", since the gasket is not captured between the pipe end and the inner end of the bell and thus be subjected to constant compressive pressure from the restraint device.

Figure 1:
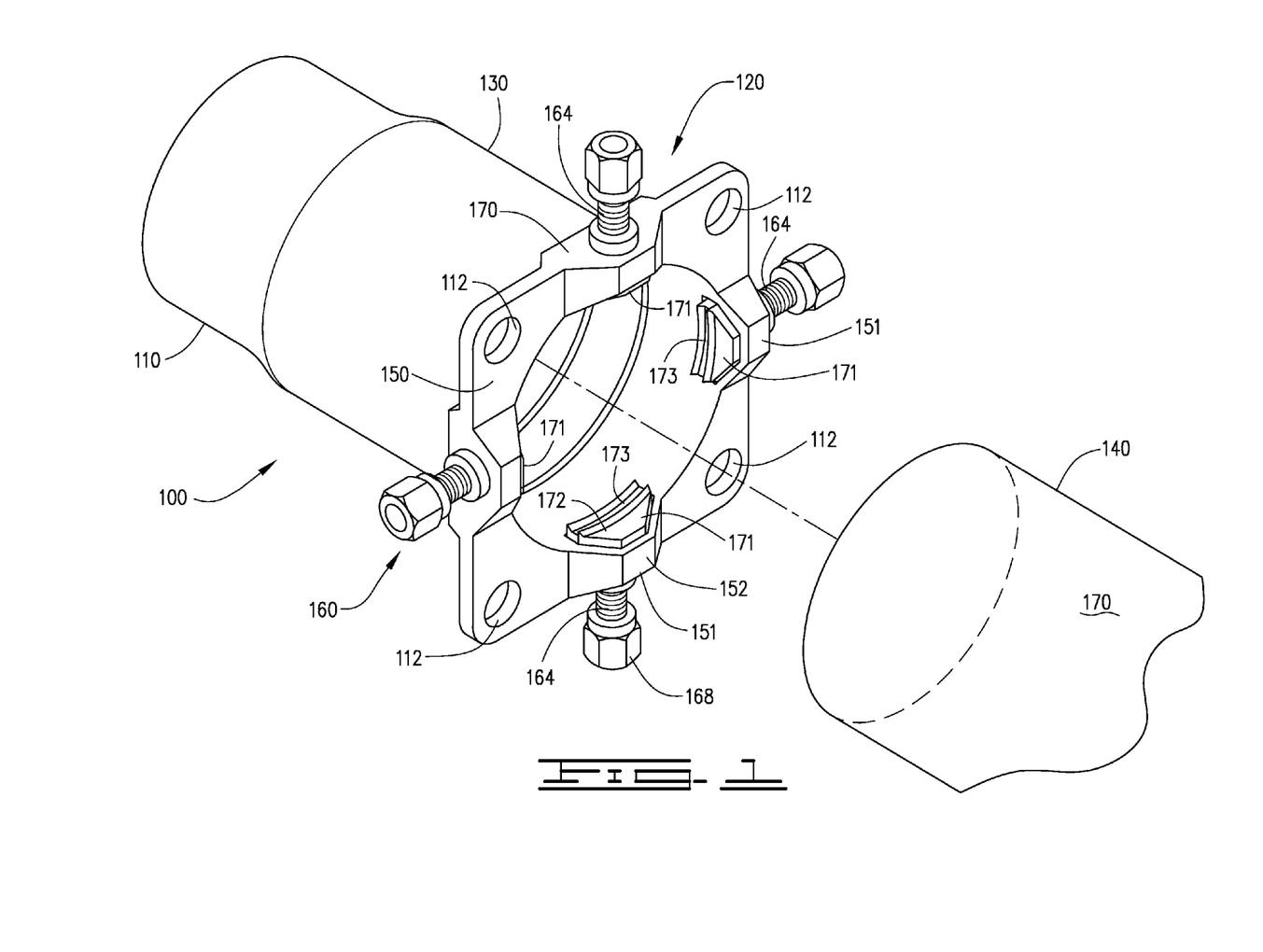
FIG. 1 shows a perspective view of a pipe end fitting with an integral restraint device, according to an embodiment of the invention.

Referring now to FIG. 1, an example 100 of a pipe end having an integral restraint mechanism may be seen, according to an embodiment of the invention. The exemplary embodiment shows a pipe 110 with the pipe end 120 flared into a bell 130 for receiving another pipe end 140. The bell 150 may have an outer end and an inner end that merges with a fitting or another pipe end. A flange 150 may extend outwardly about the outer rim of the bell 130. A restraining means 160 may be fabricated as a part of the flange 150, which may be described as the end-portion of the bell 130 and which may extend radially away from a centerline of the bell 130. The restraining means 160 shown in the example of FIG. 1 may function as a wedge-type restraining mechanism, in which a wedge-shaped object is made to extend inwardly from the flange 150 to engage an outer surface 170 of a pipe 140 inserted therein. Holes 112 in the flange 150 may be optionally provided for attachment to existing fittings and pipes that may also have such means for securing junctions therebetween, as by bolts threaded to receive nuts, clamps, rods, or similar means. Any wedge-type restraining mechanism, as exemplified by a type described in U.S. Pat. No. 5,071,175, to Kennedy, Jr. (now expired) and hereby incorporated by reference in its entirety. Other wedge-types restraining mechanisms may be used without departing from the scope of the invention. The restraining means of the invention may be described with reference to the example of Kennedy, Jr., without limiting the invention to this particular embodiment of a wedge-type restraining mechanism.

Figure 4:
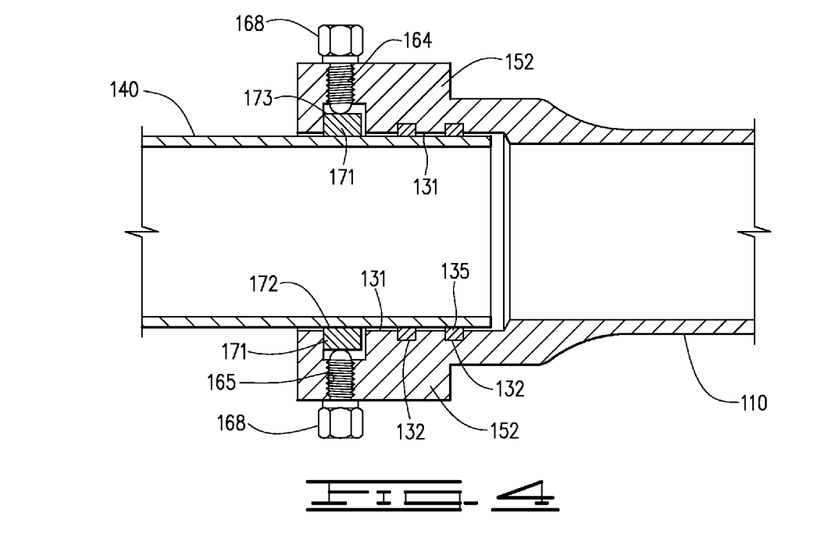
FIG. 4 shows a cut away view of the integral restraint device as it is integrated with the bell of a pipe, according to an embodiment of the invention.

Referring to FIGS. 1 and 4, four restraint mechanisms 151 are shown equally spaced about the circumference of the flange 150. Although four restraint mechanisms 151 are shown in FIG. 1, any reasonable number of restraint mechanisms 151 may be employed to comprise the restraining means 160 without departing from the scope of the invention. Each restraint mechanism 151 may comprise a housing 152 containing an unattached wedge 171. The wedge 171 may have a bottom surface 172 and a top surface 173. A tightening bolt 164 may be inserted into a threaded hole 165 extending away from a centerline of the pipe through an outer face of the housing 152. The threaded hole 165 may be perpendicular to the centerline of the pipe or it may be inclined at an angle, without departing from the scope of the invention. One end 166 of the tightening bolt 164 may engage the top surface 173 of the wedge 171 and the other end 167 of the tightening bolt 164 may be formed in a shape to allow a tool to torque the tightening bolt. The other end 167 may also be configured as a breakaway head 168. The breakaway head 168 may be fabricated to disengage from the tightening bolt 164 when a torque applied to the breakaway head 168 exceeds a selected value of torque, thus limiting the force that the tightening bolt 164 can apply to the wedge 171.

The wedge 171 may have protuberances 176, such as ridges, teeth, and the like, along its bottom surface 173, which engage the outer surface 170 of the inserted pipe 140 when the tightening bolt 164 is advanced into the threaded hole 165. Additionally, the wedge 171 may be configured to engage the inserted pipe surface 170 by means of cam action, where the wedge 171 pivots about an axis offset from a centerline of the bolt and causes the protuberances 176 to engage the surface 170 at an angle; this may permit the protuberances 176 to better resist outward force that may be exerted against the end of the pipe 140. Alternatively, the threaded hole 165 may be slightly inclined away from being perpendicular to the centerline of the pipe, so as to provide such cam action.

The wedges 171 may be held within the housing 172 by a shearable material designed to allow the wedge 171 to break away from the housing 172 when force is applied to the wedge 171. This may permit the wedges 171 to remain in position while the pipe 140 is being inserted and before the pipe 140 is secured to the bell by the restraining means 160. The shearable material may be comprised of any suitable substance without departing from the scope of the invention.

Referring now to FIG. 4, the inner surface 131 of the bell 130 may have one or more grooves 132 about the inner surface 131 and extending outwardly from the centerline of the bell 130. Each such groove 132 may contain a gasket 135. The gasket 135 may be formed so that an inner diameter of the gasket 135 may be slightly less than an outer diameter of the pipe 140. This difference in diameters may have the effect of compressing the gasket 135 against the outer surface of the inserted pipe 140 to form a tight seal thereby. The seal may prevent fluids flowing through the pipe 140 from escaping the pipe 140 through a gap between the inner surface 131 of the bell 130 and the outer surface 170 of the pipe 140. The gasket 135 may be made of a standard, compressible gasket material having characteristics suitable for the environment and the chemical and physical properties of the liquid that is expected to be carried by the pipe and fitting. In water system applications, the gasket material may typically conform to the standard contained in AWWA C111 (ANSI 21.11). Although the drawing shows two gaskets 135, the invention may not be limited thereby and any number of gaskets 135 may be used without departing from the scope of the invention.

The fittings, pipes, and restraint means may be made from any hardened material, but are typically fabricated from ductile iron. Portions of the restraint means may be integrated with the fitting or a pipe end to form a monolithic structure, as by casting. The wedge 171 may be made from hardened steel. The tightening bolt may also be made from hardened steel. The breakaway head 168 may be made from hardened steel and shaped for manipulation by a standard hexagonal tool.

In operation, a pipe may be forcibly inserted into a fitting that is configured with the inventive device. The pipe may be inserted a selected distance into the bell in order to conform to engineering requirements for expansion and contraction, but at least as far as the one or more gaskets so that a tight seal is maintained. Each of the tightening bolts 164 may then be sequentially tightened in a star-pattern in order to apply an even, consistent pressure against the inserted pipe. For example, in a four bolt configuration with the bolts numbered 1 through 4 sequentially about the circumference of the fitting, bolt 1 may first be tightened, then bolt 3, then bolt 2, and then bolt 4. The sequence may be repeated again until all breakaway heads 168 have broken away from the tightening bolts 164. In this way, a restrained push-on connection for push-on pipe may be made according to the invention.

Figures 2A, 2B:
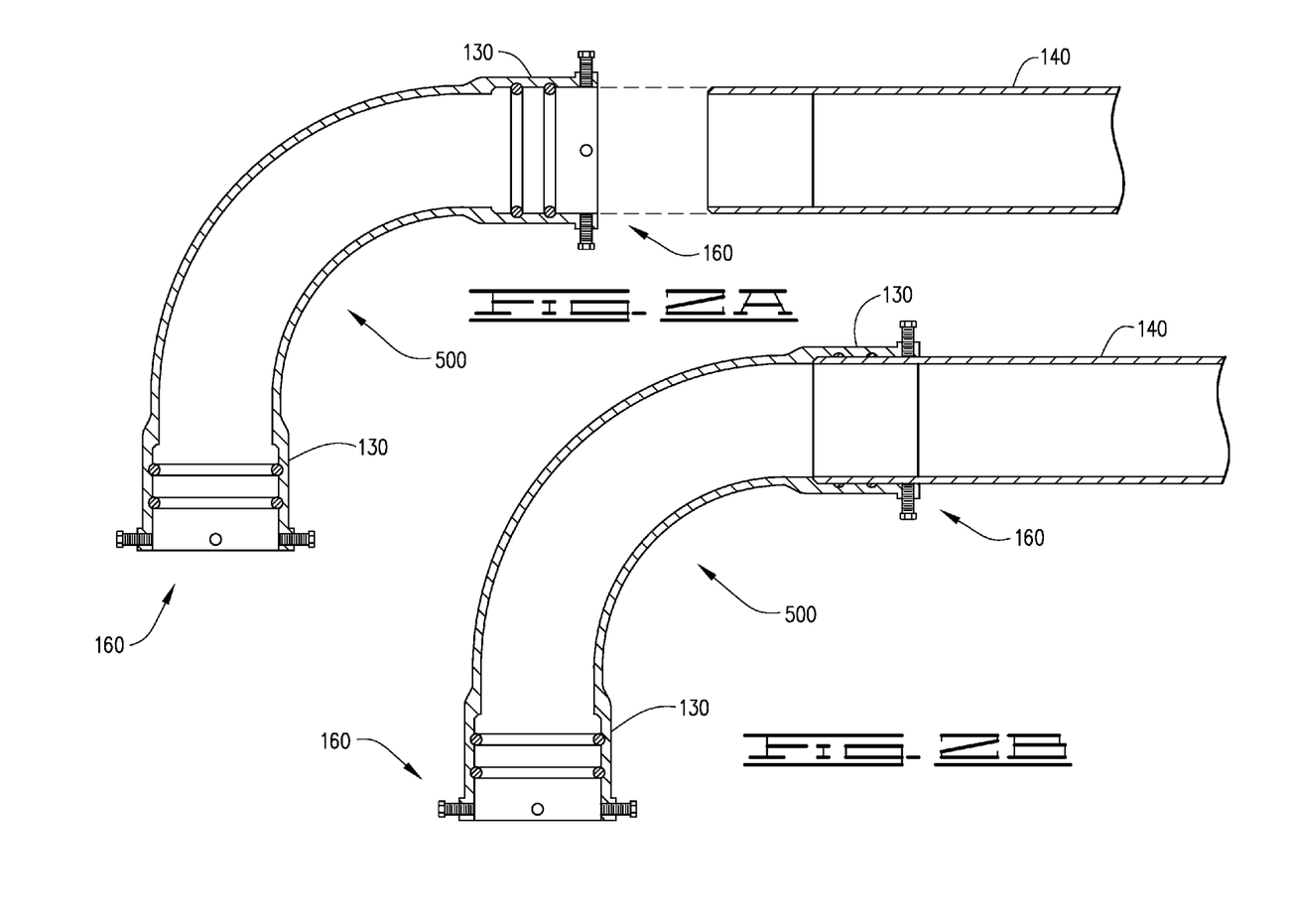
FIG. 2 shows a 90° elbow fitting having an integral restraint device at both ends, according to an embodiment of the invention.

The invention may be employed in a variety of fittings having bell-shaped enclosures to receive pipe ends. Referring to FIG. 2, an elbow 500 is shown having a bell 130 on each end, with each bell being configured with inventive restraint means 160. Note that although the elbow 500 shown in the figure is a 90° elbow, other elbow configurations may be used without departing from the scope of the invention, to include 45° and 22.5° fittings. In addition, either one end or both ends of the fitting shown in FIG. 2 may be configured with the invention.

Figures 5, 6:
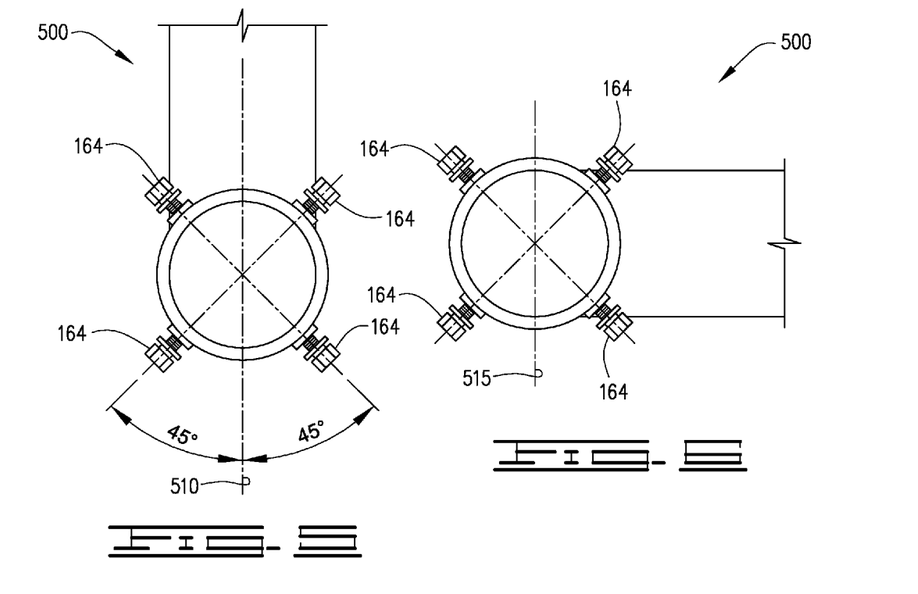
FIG. 5 shows a cross sectional view of an elbow pipe fitting in a vertical orientation, according to an embodiment of the invention.
FIG. 6 shows a cross sectional view of an elbow pipe fitting in a horizontal orientation, according to an embodiment of the invention.

The 90° elbow 500 shown in FIG. 2 may be installed in vertical or horizontal orientations (see FIGS. 6 and 5, respectively). In practice, an elbow 500 may be a component of a water line that is buried underground. Such water lines in general are laid in a horizontal plane at a standard depth belowground (see FIG. 6). When it is desired to deliver the water to the surface, a 90° elbow may be employed to direct the water in a vertical direction (see FIG. 5). In order to facilitate tightening of the bolts by workmen in a trench, it is undesirable to locate the tightening bolts 164 vertically under the elbow 500 since this location makes the tightening bolts 164 difficult to access and to inspect for the workmen's compliance with tightening procedures. The restraining means for a fitting such as the elbow 500 may configured axially so that, when the elbow 500 is positioned in a standard vertical or horizontal position, none of the tightening bolts is directly below a vertical centerline 510 of the fitting. In other words, in a configuration of the restraining means 160 having four tightening bolts 164, the restraining means 160 may be configured with the elbow fitting so that the two lower tightening bolts are each 45° on the clockwise and counterclockwise sides of a vertical centerline line. This arrangement may hold true for any even number of tightening bolts, and any even number of tightening bolts may be used in this arrangement without departing from the scope of the invention.

Figure 3:
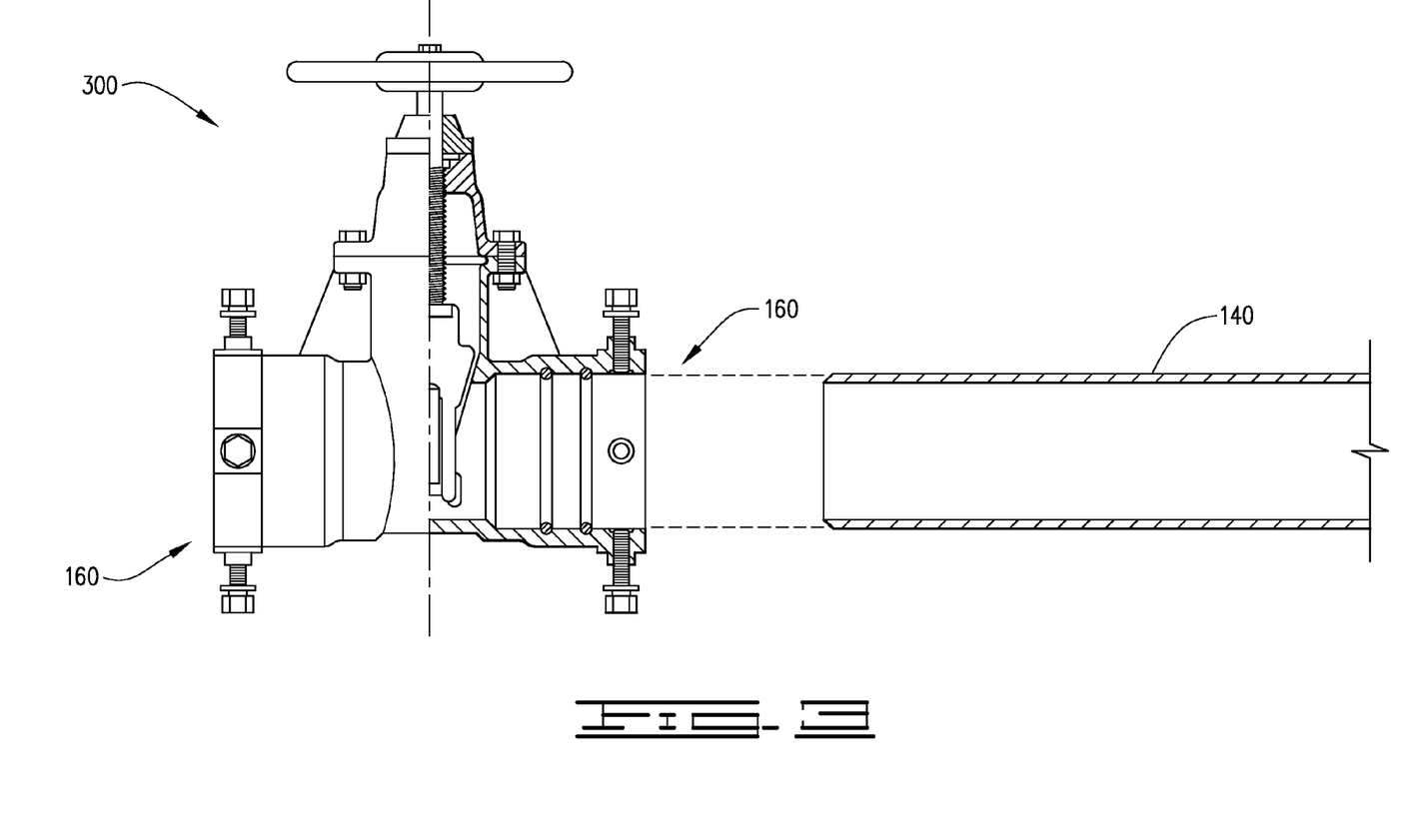
FIG. 3 shows a valve having an integral restraint device at both ends, according to an embodiment of the invention.

Referring to FIG. 3, a valve 300 is shown with a bell 130 on one side of the gate and a bell 130 on the other side of the gate. Each of the bells 130 may be configured with the inventive restraint means 160. Again, as with the elbow 500, other configurations are possible, such as configuring the valve 300 having only one bell 139.

From the foregoing, it will be understood by persons skilled in the art that push-on joint having an integral mechanical restraint means has been provided. The invention is relatively simple and easy to manufacture, yet affords a variety of uses. While the description contains many specifics, these should not be construed as limitations on the scope of the invention, but rather as an exemplification of the preferred embodiments thereof. The foregoing is considered as illustrative only of the principles of the invention. Further, because numerous modifications and changes will readily occur to those skilled in the art, it is not desired to limit the invention to the exact construction and operation shown and described, and accordingly all suitable modifications and equivalents may be resorted to, falling within the scope of the invention. Although this invention has been described in its preferred form with a certain degree of particularity, it is understood that the present disclosure of the preferred form has been made only by way of example and numerous changes in the details of construction and combination and arrangement of parts may be resorted to without departing from the spirit and scope of the invention as set forth in the following claims.

We claim:

1. A pipe restraint system comprising
a pipe having a pipe end and an pipe outer surface;
a fitting having a bell sized to receive the pipe end, the bell having an inner bell surface, an outer bell surface, an outer bell end, and a centerline traversing therethrough, the fitting further having a restraint mechanism integral to the bell to form a monolithic structure, the restraint mechanism comprising
a plurality of housings, each housing having internal wall surfaces defining a wedge pocket along the inner bell surface, the housing having a threaded hole opening with an axis extending away from the centerline, the threaded hole extending from the housing to the outer bell surface;
a wedge shaped to be received within each housing, the wedge having a bottom surface with a protuberance extending therefrom for gripping engagement with the outer pipe surface at the pipe end;
a tightening bolt sized for threaded insertion into the threaded hole from the outer bell surface, the tightening bolt having an inner end and an outer end, the inner end adapted to engage the wedge when the tightening bolt is advanced into the housing from the outer bell surface, the outer end having a head for engagement with a tool to allow rotational force exerted by the tool to advance the tightening bolt towards the centerline and thereby force the protuberance into the pipe outer surface so as to prevent pressure exerted by a liquid flowing through the pipe from forcing the pipe out of the bell; and
a gasket for insertion within a circumferential groove about the inner bell surface, the gasket sized to maintain snug contact with the outer pipe surface of the pipe end to prevent the liquid passing through the pipe and the fitting from escaping through the junction between the outer pipe surface and the inner bell surface.

2. The system described in claim 1, wherein the inner end of the tightening bolt is rounded.

3. The system described in claim 1, wherein the outer end of the tightening bolt breaks off when the tightening bolt is torqued beyond a selected torque limit.

4. The system described in claim 1, wherein the fitting is part of a device selected from a group consisting of a valve, an elbow, and a pipe end.

5. The system described in claim 1, wherein the housing is positioned along a flange about the outer bell end and permanently connected thereto.

6. The system described in claim 1, wherein the housing and the flange are connected as by casting.

7. A method for restraining a pipe end within a fitting, the method comprising the steps of:
providing a fitting with a bell, the fitting sized to receive a pipe end, the bell having an inner bell surface, an outer bell surface, and a centerline traversing therethrough, the fitting further having a pipe restraint device integral to the bell to form a monolithic structure, the pipe restraint device comprising
a housing having internal wall surfaces defining a wedge pocket along the inner bell surface, the housing having a threaded hole opening with an axis substantially perpendicular to the centerline, the threaded hole extending from the housing to the outer bell surface;
a wedge shaped to be received within the housing, the wedge having a bottom surface with a protuberance extending therefrom for gripping engagement with an outer pipe surface of the pipe end;
a tightening bolt sized for threaded insertion into the threaded hole from the outer bell surface, the tightening bolt having an inner end and an outer end, the inner end adapted to engage the wedge when the tightening bolt is advanced into the housing from the outer bell surface, the outer end with a head for engagement with a tool to allow rotational force exerted by the tool to advance the tightening bolt towards the centerline and thereby force the protuberance into the outer pipe surface so that the pipe end is restrained from being forced outwardly from the bell by pressure of a liquid flowing through the pipe end, wherein the outer end of the tightening bolt breaks off when the tightening bolt is torqued beyond a selected torque limit;
installing a gasket into a groove circumferentially extending about the inner bell surface;
inserting a pipe end into the bell and through the gasket to form a seal; and
tightening the tightening bolts of the restraint device to securely hold the pipe end within the bell.

8. A fitting for forming a joint with a pipe end, the fitting comprising:
a bell for receiving the pipe end, the bell having an outer rim and an inner bell surface;
a restraining means formed in the outer rim of the bell, wherein the restraining means has a plurality of housings formed within the outer rim, each housing sized to receive a wedge having a protuberance that is forced into an outer surface of a pipe end that is inserted into the bell, wherein the restraining means securely captures the pipe end so that the pipe end is prevented from being forced from the bell by pressure of a liquid flowing through the pipe end; and
a gasket contained within a circumferential groove in the inner bell surface; the gasket sized to maintain snug contact with an outer pipe surface of the pipe end to prevent a liquid passing through the pipe and the fitting from escaping through the junction between the outer pipe surface and the inner bell surface.

9. The fitting recited in claim 8, wherein the the protuberance in gripping engagement with the outer pipe surface of the pipe end, wherein the pipe end is prevented from disengaging from the bell.

10. The fitting recited in claim 9, wherein the fitting has a threaded hole extending from an outer bell surface to the housing, the threaded hole receiving a tightening bolt that, when advanced into the threaded hole, applies a force against the wedge and forcing the protuberance into the outer pipe surface.

11. The fitting recited in claim 10, wherein the tightening bolt has a breakaway head that disengages from the tightening bolt when the torque applied to the breakaway head for advancing the tightening bolt into the threaded hole exceeds a selected torque value.

12. The fitting recited in claim 8, wherein the fitting is integral with a device chosen from a group consisting of a valve, an elbow, and a pipe end.

13. The fitting recited in claim 8, wherein the pipe end is of a polyvinylchloride pipe.

14. The fitting recited in claim 8, wherein the bell and the restraining means are monolithic and of a single casting.

* * * * *